(12) United States Patent
Wang et al.

(10) Patent No.: US 8,178,458 B2
(45) Date of Patent: May 15, 2012

(54) DIELECTRIC CERAMIC COMPOSITION

(75) Inventors: Sea-Fue Wang, Taipei (TW); Yuh-Ruey Wang, Taipei County (TW); Bo-Sen Yang, Hsinchu (TW)

(73) Assignee: National Taiwan University Technology, Taipei (TW)

( * ) Notice: Subject to any disclaimer, the term of this patent is extended or adjusted under 35 U.S.C. 154(b) by 12 days.

(21) Appl. No.: 12/628,994

(22) Filed: Dec. 1, 2009

(65) Prior Publication Data
US 2011/0130268 A1 Jun. 2, 2011

(51) Int. Cl.
*C04B 35/468* (2006.01)
(52) U.S. Cl. .......... 501/137; 501/138; 501/139
(58) Field of Classification Search .......... 501/137, 501/138, 139
See application file for complete search history.

(56) References Cited

U.S. PATENT DOCUMENTS

| | | | | |
|---|---|---|---|---|
| 5,801,111 A * | 9/1998 | Wada et al. | | 501/138 |
| 6,245,433 B1 * | 6/2001 | Nakamura et al. | | 428/469 |
| 6,291,380 B1 * | 9/2001 | Yokoi et al. | | 501/138 |
| 6,403,513 B1 * | 6/2002 | Sato et al. | | 501/137 |
| 6,548,437 B2 * | 4/2003 | Sato et al. | | 501/139 |
| 6,699,809 B2 * | 3/2004 | Fujikawa et al. | | 501/138 |
| 6,746,980 B2 * | 6/2004 | Tokita et al. | | 501/137 |
| 6,764,976 B2 | 7/2004 | Kobayashi et al. | | |
| 6,809,052 B2 | 10/2004 | Horie et al. | | |
| 6,999,302 B2 | 2/2006 | Ito et al. | | |
| 7,061,748 B2 | 6/2006 | Ito et al. | | |
| 7,262,146 B2 | 8/2007 | Ito et al. | | |
| 7,297,403 B2 | 11/2007 | Ito et al. | | |
| 7,358,208 B2 * | 4/2008 | Ito et al. | | 501/138 |
| 7,381,464 B2 | 6/2008 | Ito et al. | | |
| 7,396,791 B2 | 7/2008 | Ito et al. | | |
| 7,498,082 B2 * | 3/2009 | Ito et al. | | 428/403 |
| 8,053,385 B2 * | 11/2011 | Umeda et al. | | 501/139 |
| 2003/0186802 A1 * | 10/2003 | Watanabe et al. | | 501/136 |

FOREIGN PATENT DOCUMENTS

| | | | |
|---|---|---|---|
| JP | 06340472 | * | 12/1994 |
| JP | 2000026161 | * | 1/2000 |
| JP | 2000154055 | * | 6/2000 |
| JP | 2001114559 | * | 4/2001 |
| JP | 2002201064 | * | 7/2002 |
| JP | 2005272262 | * | 10/2005 |
| JP | 2006096574 | * | 4/2006 |
| JP | 2007063040 | * | 3/2007 |

* cited by examiner

*Primary Examiner* — Karl Group
(74) *Attorney, Agent, or Firm* — Pai Patent & Trademark Law Firm; Chao-Chang David Pai

(57) ABSTRACT

A dielectric ceramic composition is disclosed. The dielectric ceramic composition of the present invention comprises $BaTiO_3$ as the main component and one or more subcomponents. The one or more subcomponents include $Sc_2O_3$, $MgCO_3$, $BaSiO_3$, $MnCO_3$, $La_2O_3$, $CO_3O_4$ and NiO. An end product of the present invention may be formed after $BaTiO_3$ and the subcomponents undergo the following steps: (1) Wet mixing using a ball mill (2) Sintering in a reducing atmosphere (3) Annealing. The dielectric ceramic composition of the present invention can satisfy the X8R characteristic of the EIA standard and is compact or dense enough.

6 Claims, 16 Drawing Sheets

Step 1:
Add ethanol to the powder (comprising BaTiO3 and subcomponents). Then, perform wet mixing using a zirconium oxide ball mill. Next, place the mixture in an oven at 80 degree C to dry

Step 2:
Add PVA and PEG to the dried powder. Mix them well. Then, perform screening. Next, perform compaction for the powder. Next, perform binder burn-out.

Step 3:
Then, perform sintering in a reducing atmosphere and annealing. Next, perform re-oxidation.

*FIG. 1*

DIELECTRIC CERAMIC COMPOSITION

BACKGROUND OF THE INVENTION

1. Field of the Invention

The invention generally relates to a dielectric ceramic composition. More particularly, the invention relates to a dielectric ceramic composition that comprises $BaTiO_3$ as the main component and one or more subcomponents to improve the capacitor-temperature characteristic and sinterability of the main component $BaTiO_3$ so that the dielectric ceramic composition may have broader applications and higher stability.

2. Description of the Prior Art

Diamond film and diamond-like carbon exhibit predominantly high visible and infrared (IR) transmission, high mechanical strength, high electric resistance, and resistance to corrosive gas or other medium. Consequently, they can be used as highly protective materials and anti-reflective coatings. Owing to the energy crisis, research in thin-film solar cells has attracted much attention. Among materials useful in solar cells, silicon crystals have unique semiconducting characteristics and therefore can be used in semiconducting elements and solar cells. On the other hand, although diamond materials have atomic structure similar to that of silicon crystals, they are inherently an insulating material. Accordingly, a number of researchers have attempted to change the electrical property of diamond material to make it semiconducting or conducting by means of doping techniques so as to favor the application and development of diamond materials. Among those attempts, changing the electric resistance of diamond film or diamond-like carbon (DLC) film by means of doping could make it possible for diamond film or diamond-like carbon film to be applied in semiconductor or electrical elements. Methods for lowering the electric resistance of diamond film or diamond-like carbon included doping of hydrogen phosphide or diborane, blending to form metal film, nitrogen infiltration during film deposition and the like.

As technology advances, material or composition plays an important role in various types of components. Because the X7R multilayer ceramic capacitor has a stable temperature coefficient of capacitance ($\Delta C/C \leqq \pm 15\%$ in the temperature range from −55 to 125 degree C.), it has been widely used in miniaturized electronic components that operate in a large temperature variation range. In recent years, multilayer ceramic capacitors have been used in the electronic components of automobile, such as ECU (engine electronic control unit), ABS (antilock brake system) module and PGMFI. These electronic components often have to operate in a large temperature variation range, and the X7R multilayer ceramic capacitor is not able to meet this demand. For the sake of safety, the EIA (Electronic Industries Association) has stipulated the standard for X8R characteristic ($AC/C \leqq \pm 15\%$ in the temperature range from −55 to 150 degree C.) and ceramic materials or compositions meeting this standard have attracted a lot of attention.

In terms of the internal electrodes in the production process of the multilayer ceramic capacitor, the production process may be categorized into two types: precious metal process and inexpensive metal process. In the precious metal process, an alloy of silver and palladium has often been used as the internal electrodes. Therefore, the production cost is high. On the other hand, in the inexpensive metal process, an alloy of copper and nickel has often been used as the internal electrodes. Because copper and nickel are subject to oxidation, sintering has to be performed in a reducing atmosphere. In addition, the dielectric characteristics of many types of dielectric compositions would change after they undergo sintering in a reducing atmosphere.

In the prior art, dielectric compositions comprising $Bi_2O_3$, PbO and $TiO_2$ are often used for ceramic capacitors that require a stable temperature coefficient of capacitance. Because these dielectric compositions contain lead and the EU has restrictions against the use of lead, the aim of the present invention is to come up with a dielectric ceramic composition that satisfies the X8R characteristic of the EIA standard and has a high dielectric constant.

At a Tc (Curie temperature), the crystalline structure would change from a cubic structure to a tetragonal structure and a dielectric peak would occur. Therefore, these two factors limit the applications of the compositions of the prior art. Because $BaTiO_3$ has a high dielectric constant, it is often used in passive components; in addition, composition with a high dielectric constant would enable a component to be more compact and lighter. Because the capacitor-temperature characteristic of $BaTiO_3$ needs to be improved, the compositions of the prior art needs to be modified.

In addition, in the development of the X8R multilayer ceramic capacitors, BaTiO3 has been used as the main component and one or more subcomponents (such as modifier, crystalline structure inhibitor and sintering auxiliary reagent) have been added to improve the capacitor-temperature characteristic and the sinterability.

To improve the capacitor-temperature characteristic, subcomponents are added; such addition causes chemical inhomogeneity and the formation of core-shell structure. The molecules of the pure $BaTiO_3$ form the core in a cubic structure that is paraelectric. The mixture of $BaTiO_3$ and the subcomponents form the shell in a tetragonal structure that is ferroelectric. Therefore, by changing the mole percentages of the subcomponents, one can shift Tc, and improve capacitor-temperature characteristic to satisfy the X8R characteristic.

There have been several US patents relating to the subject.

In U.S. Pat. No. 6,764,976, a ceramic composition is disclosed. 100 moles of BaTiO3 is used as the main component and the subcomponents include (1) 0 to 0.1 mole of the oxides of Mg, Ca, Ba and Sr (2) 1.0 to 7.0 moles of the oxides of Y, Dy, Ho and Er (3) 0 to 5.0 moles of $CaZrO_3$ (4) 2.0 to 10.0 moles of the silicic acids of Ba, Ca, Sr, Li and B (5) 0 to 0.5 mole of the oxides of Mn and Cr (6) 0.01 to 0.5 mole of the oxides of V, Mo and W. Such ceramic composition can satisfy the X8R characteristic of the EIA standard.

In U.S. Pat. No. 6,809,052, another ceramic composition is disclosed. 100 moles of BaTiO3 is used as the main component and the subcomponents include (1) 0.1 to 5.0 moles of the oxides of Mg, Ca, Ba and Sr (2) 2.0 to 10.0 moles of $SiO_2$ (3) 0.8 to 1.2 moles of $(Ba, Ca)_xSiO2+x$ as the sintering auxiliary reagent (4) 0.5 to 0.7 mole of the oxides of V, Mo and W (5) 0.1 to 10.0 moles of R1 (its "CN" is 9 and the ion radius is less than 108 pm) and 0.1 to 10.0 moles of R2 (its "CN" is 9 and the ion radius is in the range from 108 pm to 113 pm) (the total quantity of R1 and R2 is less than 10.0 moles) (6) 0 to 0.5 mole of the oxides of Mn and Cr. Such ceramic composition can satisfy the X8R characteristic of the EIA standard.

In U.S. Pat. No. 6,999,302, another ceramic composition is disclosed. 100 moles of BaTiO3 is used as the main component and the subcomponents include (1) 0.1 to 3.0 moles of the oxides of Mg, Ca, Ba and Sr (2) 2.0 to 10.0 moles of $SiO_2$ (3) 0.01 to 0.5 mole of the oxides of W, V and Mo (4) 0.5 to 7.0 moles of R1 (Sc, Er, Tm, Yb and Lu) (5) 0 to 5.0 moles of $CaZrO_3$ (6) 2.0 to 8.0 moles of R2 (Y, Dy, Ho, Tb, Gd and Eu). Such ceramic composition can satisfy the X8R characteristic of the EIA standard.

In U.S. Pat. No. 7,061,748, another ceramic composition is disclosed. 100 moles of BaTiO3 is used as the main component and the subcomponents include (1) 0.1 to 3.0 moles of the oxides of Mg, Ca, Ba and Sr (2) 2.0 to 10.0 moles of SiO2 (3) 0.01 to 0.5 mole of the oxides of W, V and Mo (4) 0.5 to 7.0 moles of R1 (Sc, Er, Tm, Yb and Lu) (5) 0 to 5.0 moles of $CaZrO_3$ (6) Organic salt containing Zr and Ca. Such ceramic composition can satisfy the X8R characteristic of the EIA standard.

In U.S. Pat. No. 7,262,146, another ceramic composition is disclosed. 100 moles of BaTiO3 is used as the main component and the subcomponents include (1) 0.1 to 3.0 moles of the oxides of Mg, Ca, Ba and Sr (2) 2.0 to 10.0 moles of a sintering auxiliary reagent (3) 0.01 to 0.5 mole of the oxides of W, V and Mo (4) 0.5 to 7.0 moles of R1 (Sc, Er, Tm, Yb and Lu) (5) 0 to 5.0 moles of $CaZrO_3$ (6) 0 to 9.0 moles of R2 (Y, Dy, Ho, Tb, Gd and Eu) (the total quantity of R1 and R2 is less than 13 moles) (7) 0 to 0.5 mole of MnO (8) 0 to 4 moles of the oxides of Al, Gr, Ga and Ge. Such ceramic composition can satisfy the X8R characteristic of the EIA standard.

In U.S. Pat. No. 7,297,403, another ceramic composition is disclosed. 100 moles of $BaTiO_3$ is used as the main component and the subcomponents include (1) 0.1 to 3.0 moles of MgO, CaO, BaO and SrO (2) 2.0 to 10.0 moles of SiO2 (3) 0.01 to 0.5 mole of V2O5, MoO3 and WO3 (4) 0.5 to 0.7 mole of the oxides of Sc, Er, Tm, Yb and Lu (5) 0 to 5.0 moles of CaZrO3 (6) 0 to 9.0 moles of Y, Dy, Ho, Tb, Gd and Eu (rare earth elements) (7) 0 to 0.5 mole of MnO. Such ceramic composition can satisfy the X8R characteristic of the EIA standard.

In U.S. Pat. No. 7,381,464, two ceramic compositions are disclosed. One of the two ceramic compositions comprises 100 moles of BaTiO3 is used as the main component and the subcomponents include (1) 2 to 10 moles of the oxides of Mg, Ca, Ba and Sr (2) 0.01 to 0.5 mole of the oxides of V, Mo and W (3) 0.5 to 7 moles of the oxides of Sc, Er, Tm, Yb and Lu (4) 0 to 5.0 moles of $CaZrO_3$ (5) 0 to 9.0 moles of Y, Dy, Ho, Tb and Eu (rare earth elements) (6) 0 to 0.5 mole of MnO. Such ceramic composition can satisfy the X8R characteristic of the EIA standard.

The other ceramic composition disclosed in U.S. Pat. No. 7,381,464 comprises 100 moles of $BaTiO_3$ as used as the main component, and the subcomponents include (1) 0 to 0.1 mole of the oxides of Mg, Ca, Ba and Sr (2) 1 to 7.0 moles of Y, Dy, Tm, Ho and Eu (rare earth elements) (3) 2.0 to 10.0 moles of $MxSiO_3$ (where M includes Ba, Ca, Sr, Li and B) (4) 0 to 0.5 mole of MnO (5) 0.01 to 0.5 mole of the oxides of V, Mo and W (6) 0 to 5.0 moles of $CaZrO_3$. Such ceramic composition can satisfy the X8R characteristic of the EIA standard. In U.S. Pat. No. 7,396,791, another ceramic composition is disclosed. 100 moles of $Ba1-xCaxZr1-yTiyO_3$ (where 0<x<0.15 and 0<y<1.0) is used as the main component and the subcomponents include (1) 0.01 to 0.2 mole of the oxides of V, Mo and W (2) 1.0 to 10.0 moles of the oxides of Mg, Ca, Ba and Sr (3) 0.1 to 5 moles of the oxides of Sc, Y, La, Ce, Pr, Nd, Pm, Sm, Eu, Gd, Tb, Dy, Ho, Er, Tm, Yb and Lu (4) 1 to 10 moles of $SiO_2$. Such ceramic composition can satisfy the X8R characteristic of the ETA standard.

From the above, we can see that the compositions of the prior art have many disadvantages and need to be improved.

To eliminate the disadvantages of the compositions of the prior art, the inventor has put in a lot of effort in the subject and has successfully come up with the dielectric ceramic composition of the present invention.

SUMMARY OF THE INVENTION

A first object of the present invention is to provide a dielectric ceramic composition which includes one or more subcomponents to improve the capacitor-temperature characteristic and sinterability of the main component BaTiO3 so that such dielectric ceramic composition may have broader applications and higher stability.

Another object of the present invention is to provide a dielectric ceramic composition which maintains its dielectric characteristics after undergoing sintering in a reducing atmosphere and which includes less expensive subcomponents to lower the production cost.

To reach these objects, the dielectric ceramic composition of the present invention is disclosed. The dielectric ceramic composition of the present invention comprises $BaTiO_3$ as the main component and one or more subcomponents. The one or more subcomponents include $Sc_2O_3$ (the first subcomponent, 0.5 to 3.5 mol %), $MgCO_3$ (the second subcomponent, 1.0 to 3.0 mol %), $BaSiO_3$ (the third subcomponent, 1.0 to 3.0 mol %), $MnCO_3$ (the 4th subcomponent, 0 to 0.5 mol %), $La_2O_3$ (the 5th subcomponent, 0 to 0.25 mol %), $CO_3O_4$ (the 6th subcomponent, 0 to 0.25 mol %) and NiO (the 7th subcomponent, 0 to 0.25 mol %). The end product of the present invention is formed after $BaTiO_3$ and the subcomponent(s) undergo the following steps: (1) Wet mixing using a ball mill (2) Sintering in a reducing atmosphere (3) Annealing. The end product of the present invention has a dielectric constant in the range from 1,150 to 2,650 and a dielectric loss in the range from 0.9 to 3.0. Therefore, the end product of the present invention can satisfy the X8R characteristic of the EIA standard and is compact or dense enough.

BRIEF DESCRIPTION OF THE DRAWINGS

FIG. 1 is a flowchart for the production of the dielectric ceramic composition of the present invention.

DETAILED DESCRIPTION OF THE PREFERRED EMBODIMENT

Please refer to FIG. 1, which is a flowchart for the production of the dielectric ceramic composition of the present invention. The production includes the following three steps:

Step 1: Add ethanol to about 20 g of the powder (comprising $BaTiO_3$ and subcomponents). Then, perform wet mixing using a zirconium oxide ball mill with a diameter of 1 cm. Next, place the mixture in an oven at 80 degree C. to dry.

Step 2: Add 5 wt % of PVA and 1 wt % of PEG to the dried powder. Mix them well. Then, perform screening by using a 60 mesh. Next, perform compaction for each 0.3 g of the powder. Next, perform binder burn-out by placing the compacted units in an oven at 550 degree C. for 4 hours.

Step 3: Then, perform sintering in a reducing atmosphere (95% of nitrogen and 3% of hydrogen) and annealing. by placing the units in an oven with the continuously increasing temperature increment of 5 degree C. per min. for 2 hours. Next, perform re-oxidation by placing the units in an oven at 900 degree C. for 2 hours.

Figure 2A:
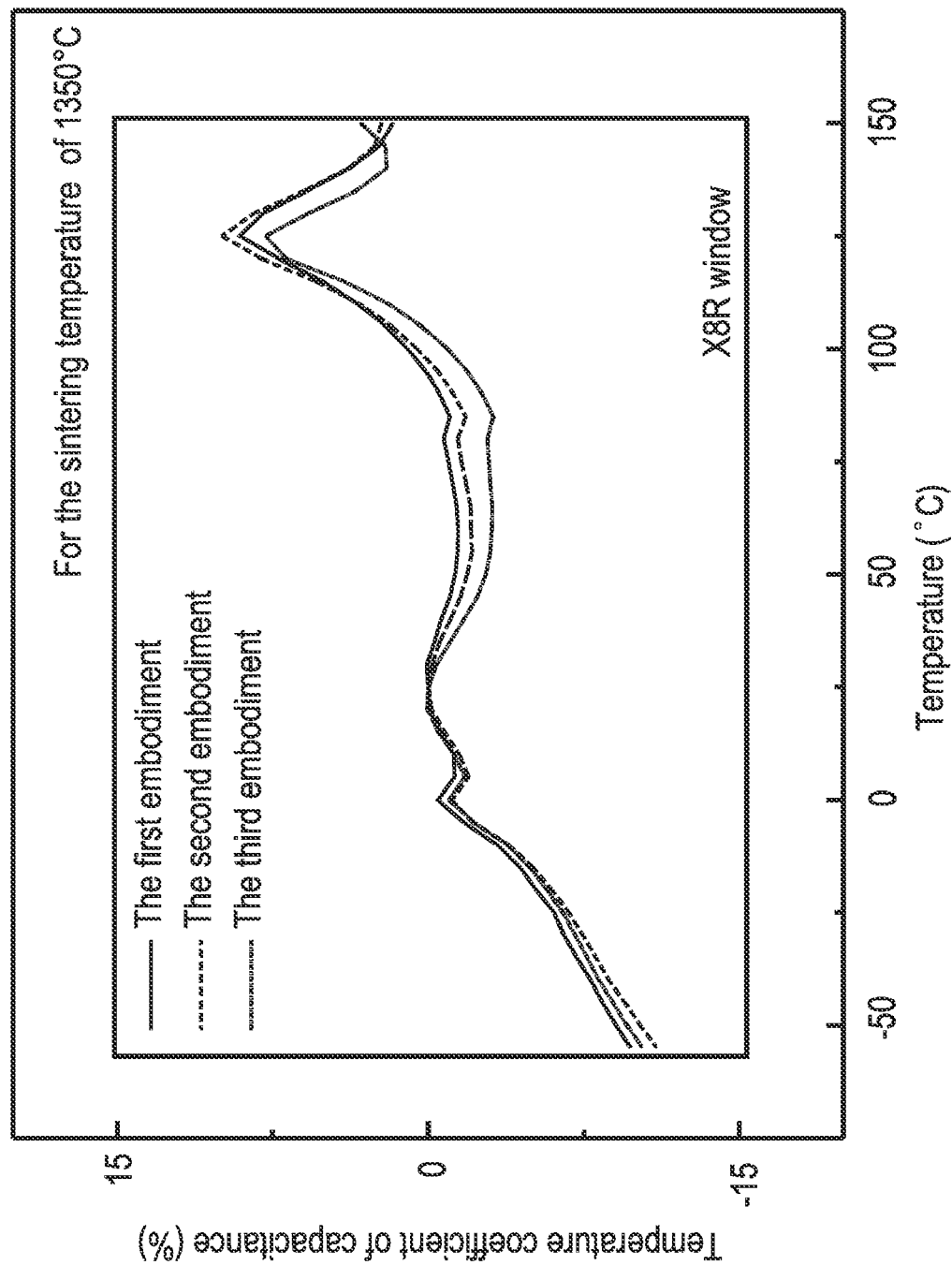
FIG. 2A is a graph illustrating the temperature coefficients of capacitance (capacitor-temperature characteristics) for the first to 3rd embodiments for the sintering temperature of 1,350 degree C.
Figure 2B:
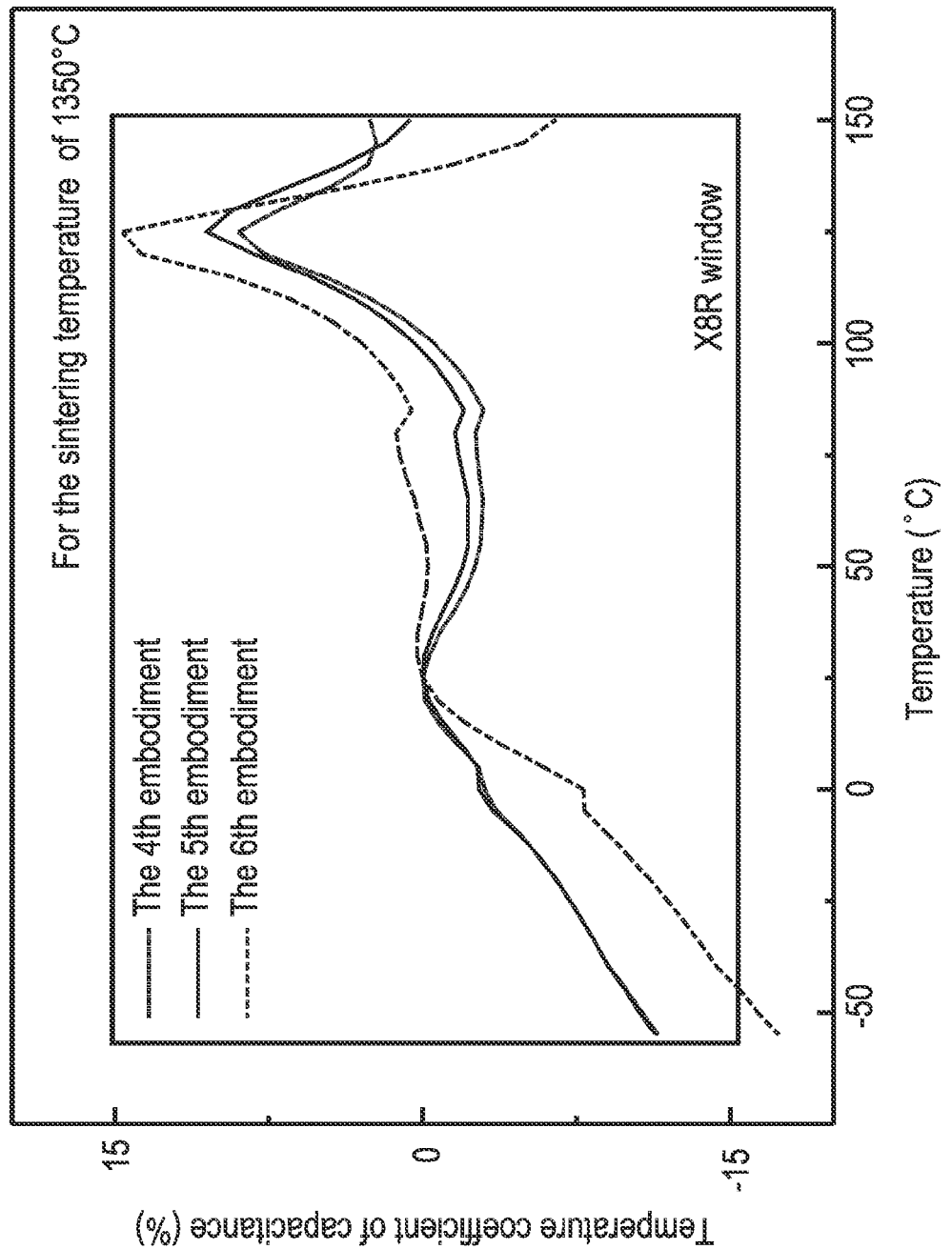
FIG. 2B is a graph illustrating the temperature coefficients of capacitance for the 4th to 6th embodiments for the sintering temperature of 1,350 degree C.
Figure 2C:
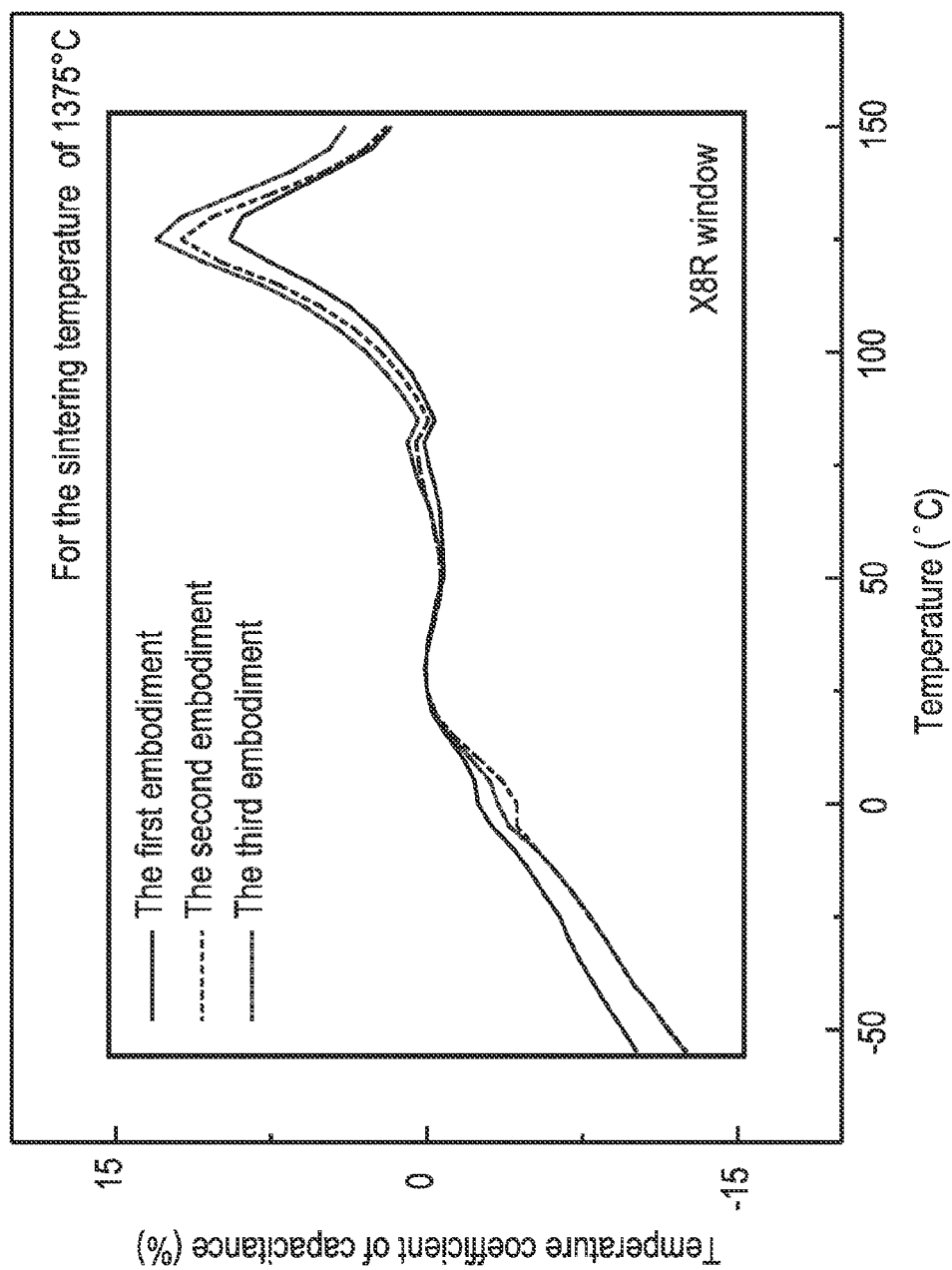
FIG. 2C is a graph illustrating the temperature coefficients of capacitance for the first to 3rd embodiments for the sintering temperature of 1,375 degree C.
Figure 2D:
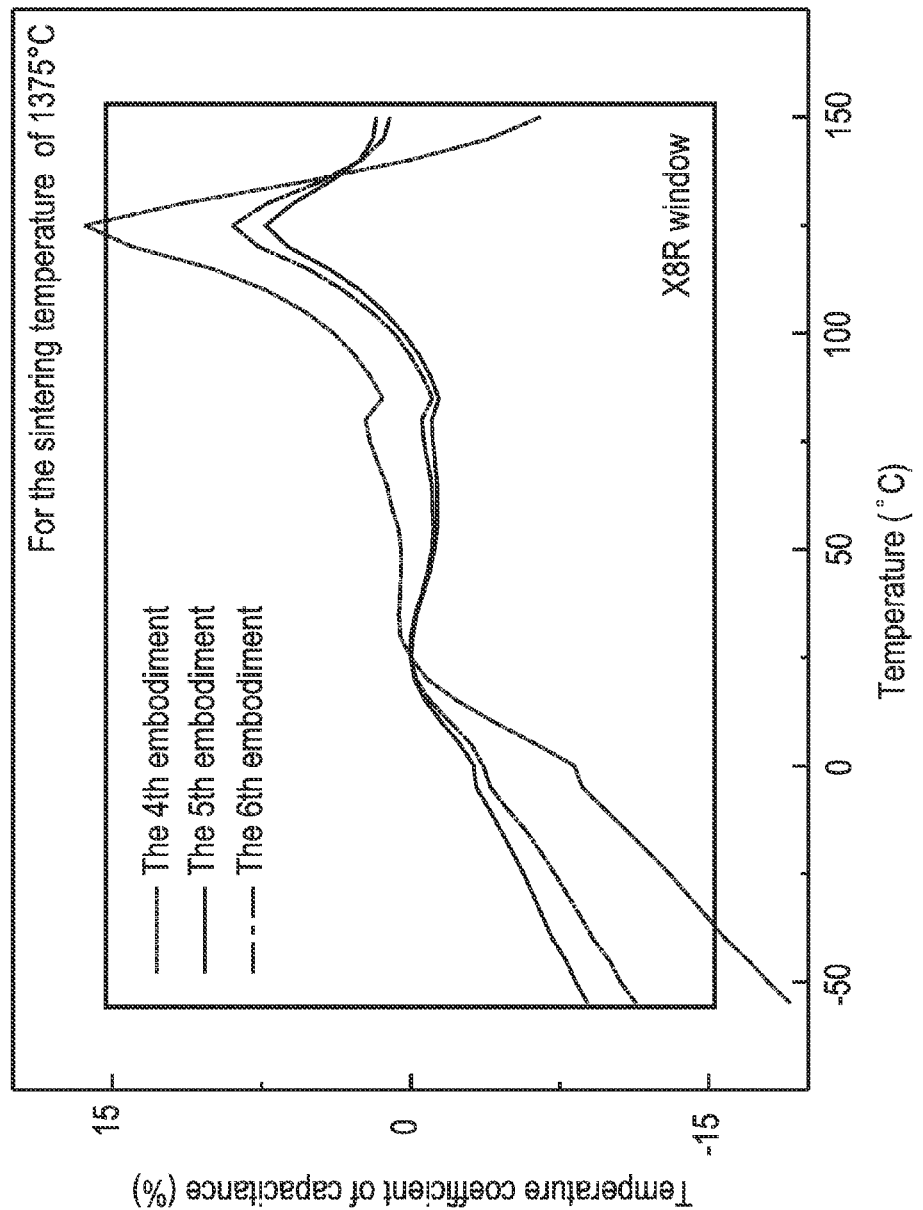
FIG. 2D is a graph illustrating the temperature coefficients of capacitance for the 4th to 6th embodiments for the sintering temperature of 1,375 degree C.

Now, please see FIGS. 2A to 2D. FIGS. 2A and 2B show the capacitor-temperature characteristics for the first to 6th embodiments for the sintering temperature of 1,350 degree C. FIGS. 2C and 2D show the capacitor-temperature characteristics for the first to 6th embodiments for the sintering temperature of 1375 degree C. The dielectric ceramic composition of the present invention comprises $BaTiO_3$ (using the pure $BaTiO_3$ powder often used in industrial applications, with an average diameter of 1.3 micrometers) as the main component and seven subcomponents. First, the pure $BaTiO_3$ powder is mixed well with the subcomponent(s). Then, the mixture undergoes compaction, binder burn-out, sintering in a reducing atmosphere and annealing. Next, we measure the temperature coefficients of capacitance of the end product in the temperature range from minus 55 to 150 degree C. (in a constant humidity test device) by using an HP-4284A LCR meter (1 VRMS & 1 kHz).

In the first to 6th embodiment, the seven subcomponents include $Sc_2O_3$, $MgCO_3$, $BaSiO_3$, $MnCO_3$, $La_2O_3$, $CO_3O_4$, NiO. As illustrated in Table 1, each of these seven subcomponents has a certain mole percentage. First, the mixture undergoes wet mixing using a ball mill and compaction. Then, it undergoes binder burn-out and sintering in a reducing atmosphere. Next, it undergoes annealing in an atmosphere of 900 degree C.

TABLE 1 the mole percentages of the seven subcomponents in the first to 6th embodiment

| Embodiment | $BaTiO_3$ | $Sc_2O_3$ | $MgCO_3$ | $BaSiO_3$ | $MnCO_3$ | $La_2O_3$ | $Co_3O_4$ | NiO |
|---|---|---|---|---|---|---|---|---|
| 1 | 100 mol % | 3.5 mol % | 2.0 mol % | 2.0 mol % | 0.0 mol % | 0.0 mol % | 0.0 mol % | 0.0 mol % |
| 2 | 100 mol % | 2.5 mol % | 2.0 mol % | 2.0 mol % | 0.0 mol % | 0.0 mol % | 0.0 mol % | 0.0 mol % |
| 3 | 100 mol % | 2.0 mol % | 2.0 mol % | 2.0 mol % | 0.0 mol % | 0.0 mol % | 0.0 mol % | 0.0 mol % |
| 4 | 100 mol % | 1.5 mol % | 2.0 mol % | 2.0 mol % | 0.0 mol % | 0.0 mol % | 0.0 mol % | 0.0 mol % |
| 5 | 100 mol % | 1.0 mol % | 2.0 mol % | 2.0 mol % | 0.0 mol % | 0.0 mol % | 0.0 mol % | 0.0 mol % |
| 6 | 100 mol % | 0.5 mol % | 2.0 mol % | 2.0 mol % | 0.0 mol % | 0.0 mol % | 0.0 mol % | 0.0 mol % |

In the first to 6th embodiment, we can see that, as the mole percentage of $Sc_2O_3$ decreases, the compactness increases, the dielectric constant increases and the dielectric loss decreases. In the first to 5th embodiment, though these five compositions show a stable capacitor-temperature characteristic, their dielectric constants and densities (compactness levels) do not meet the relevant standards. In the 6th embodiment, after the composition undergoes sintering at 1375 degree C., the end product has the density of 5.75 g/cm³, the dielectric constant of 2,396 and the dielectric loss of 1.33%. Please see Table 2.

From the 7th and 8th embodiments, we can see that the increase of the mole percentage of $MgCO_3$ would better the capacitor-temperature characteristic and flatten the peak. In the 8th embodiment, after the composition undergoes sintering at the temperature of 1350 degree C., the end product has the density of 5.79 g/cm³, the dielectric constant of 2,014 and the dielectric loss of 1.5% and satisfies the X8R characteristic of the EIA standard. Please see Table 4.

TABLE 2 the physical characteristics of the samples of the first to 6th embodiments for the sintering temperatures of 1,350 and 1,375 degree C.

| Embodiment | Sintering temperature (° C.) | Density (g/cm³) | Dielectric constant | Df(%) | TCC(ΔC/C %) −55° C. | +125° C. | +150° C. |
|---|---|---|---|---|---|---|---|
| 1 | 1350 | 5.11 | 1159 | 1.35 | −10.12 | 9.486 | 1.66 |
|   | 1375 | 5.49 | 1161 | 1.38 | −9.75 | 9.10 | 1.69 |
| 2 | 1350 | 5.12 | 1160 | 1.67 | −12.49 | 13.04 | 3.91 |
|   | 1375 | 5.52 | 1171 | 1.58 | −11.01 | 9.94 | 2.25 |
| 3 | 1350 | 5.47 | 1221 | 1.51 | −11.37 | 10.42 | 3.11 |
|   | 1375 | 5.60 | 1304 | 1.61 | −12.51 | 11.84 | 1.91 |
| 4 | 1350 | 5.49 | 1271 | 1.44 | −11.45 | 8.98 | 2.58 |
|   | 1375 | 5.62 | 1650 | 1.39 | −11.35 | 8.94 | 1.04 |
| 5 | 1350 | 5.56 | 1269 | 1.50 | −11.32 | 10.5 | 0.65 |
|   | 1375 | 5.62 | 2007 | 1.04 | −8.89 | 7.28 | 1.72 |
| 6 | 1350 | 5.73 | 1929 | 1.64 | −17.33 | 14.62 | −6.46 |
|   | 1375 | 5.75 | 2396 | 1.33 | −19.08 | 16.39 | −6.51 |

("Df(%)" stands for dielectric loss and "TCC" stands for temperature coefficient of capacitance)

Figure 3A:
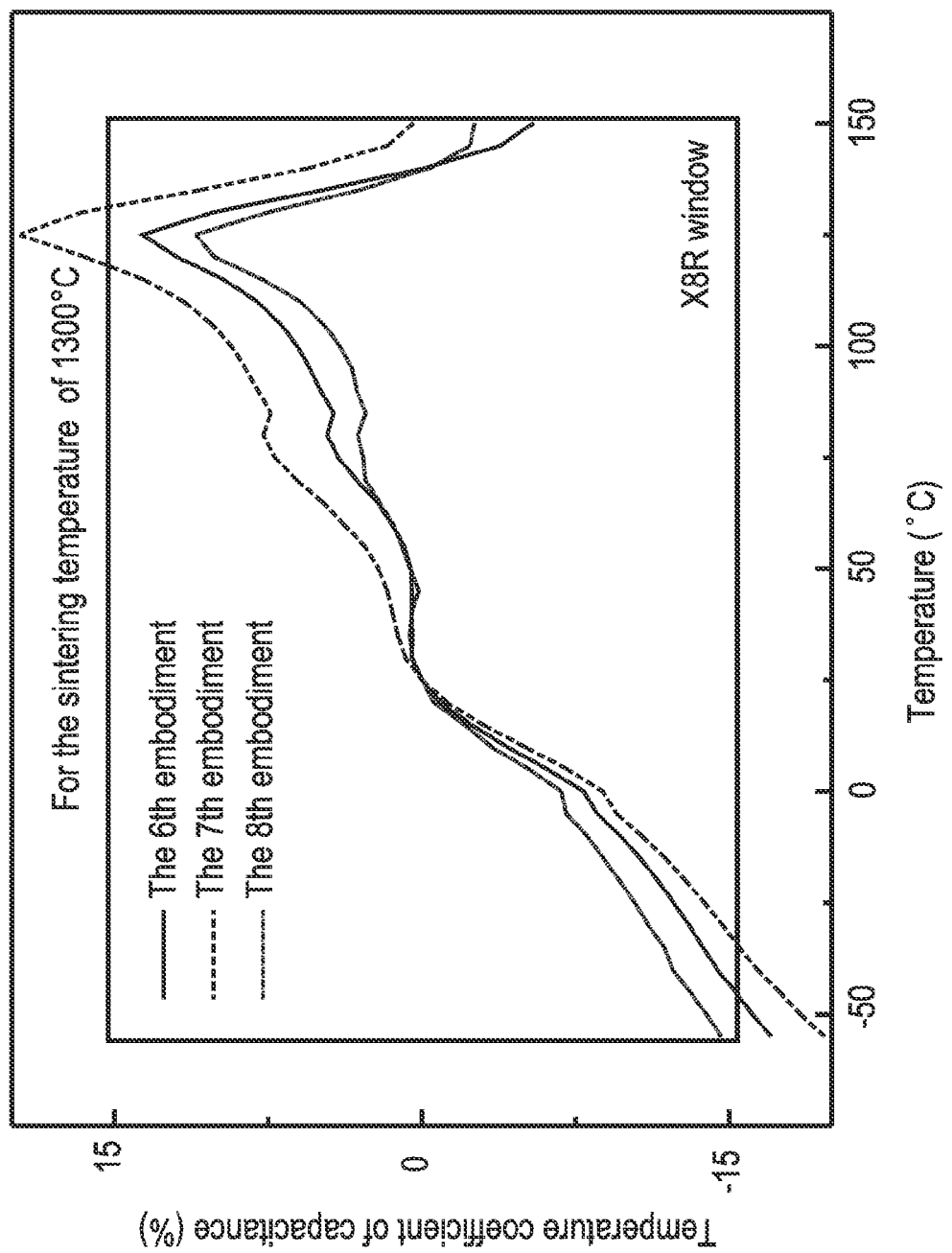
FIG. 3A is a graph illustrating the temperature coefficients of capacitance for the 6th to 8th embodiments for the sintering temperature of 1,300 degree C.
Figure 3B:
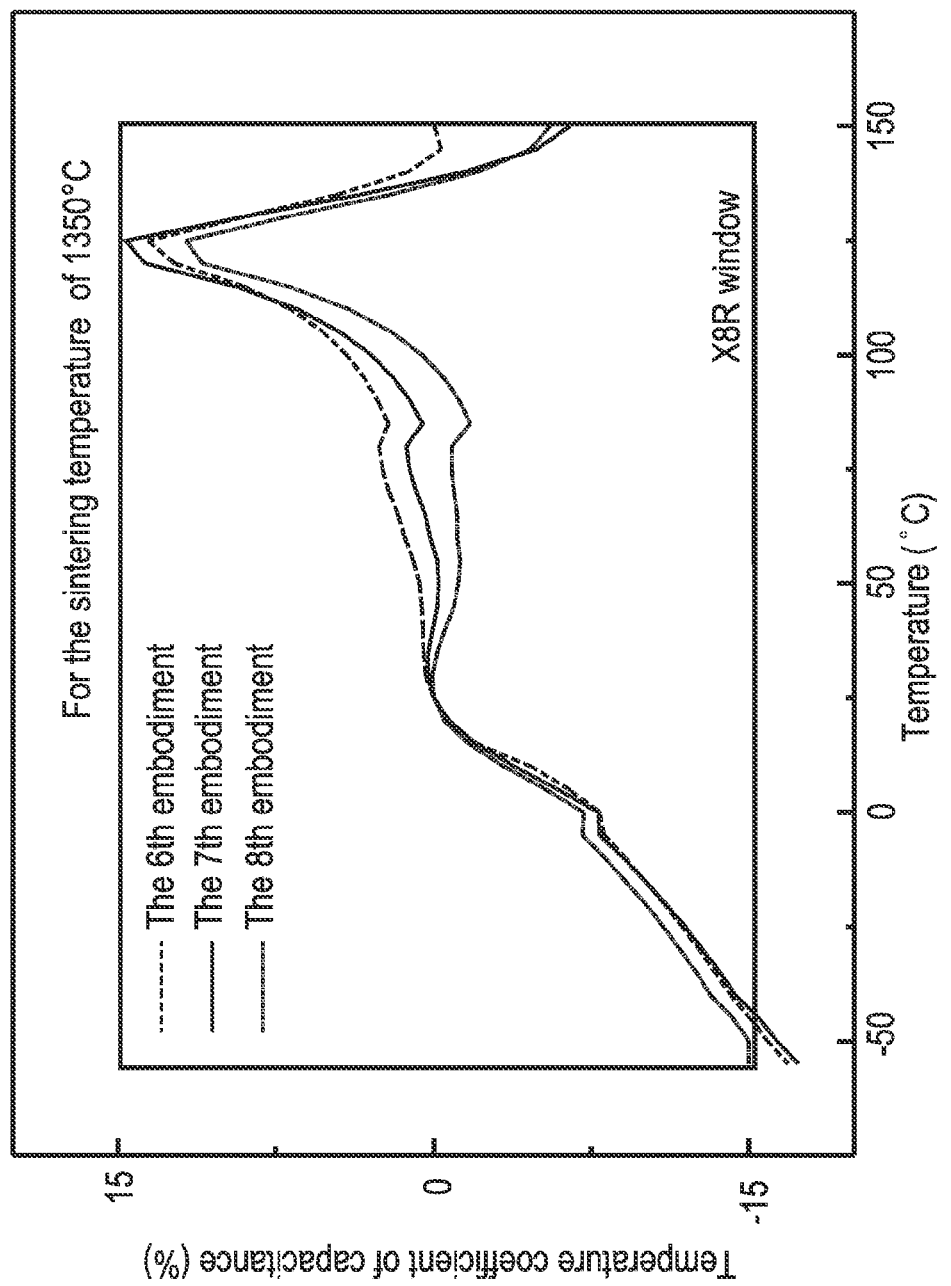
FIG. 3B is a graph illustrating the temperature coefficients of capacitance for the 6th to 8th embodiments for the sintering temperature of 1,350 degree C.

Please see FIGS. 3A and 3B, which show the capacitor-temperature characteristics for the 6th to 8th embodiments for the sintering temperatures of 1300 degree C. and 1350 degree C. From the first to 6th embodiments, we can see that sintering temperature needs to be increased as the mole percentage of $Sc_2O_3$ increases and the sintering temperature does not need to be increased if the mole percentage of $Sc_2O_3$ is 0.5 (as in the 6th embodiment). Therefore, the mole percentage of $Sc_2O_3$ is fixed at 0.5 and we increase the mole percentage of $MgCO_3$ to better the capacitor-temperature characteristic. Please see Table 3.

TABLE 3 the mole percentages of the seven subcomponents in the 6th to 8th embodiment

| Embodiment | $BaTiO_3$ | $Sc_2O_3$ | $MgCO_3$ | $BaSiO_3$ | $MnCO_3$ | $La_2O_3$ | $Co_3O_4$ | NiO |
|---|---|---|---|---|---|---|---|---|
| 6 | 100 mol % | 0.5 mol % | 2.0 mol % | 2.0 mol % | 0.0 mol % | 0.0 mol % | 0.0 mol % | 0.0 mol % |
| 7 | 100 mol % | 0.5 mol % | 1.0 mol % | 2.0 mol % | 0.0 mol % | 0.0 mol % | 0.0 mol % | 0.0 mol % |
| 8 | 100 mol % | 0.5 mol % | 3.0 mol % | 2.0 mol % | 0.0 mol % | 0.0 mol % | 0.0 mol % | 0.0 mol % |

TABLE 4 the physical characteristics of the samples of the 7th and 8th embodiments
for the sintering temperatures of 1,300 and 1,350 degree C.

| Embodiment | Sintering temperature (° C.) | Density (g/cm³) | Dielectric constant | Df(%) | TCC(ΔC/C %) | | |
|---|---|---|---|---|---|---|---|
| | | | | | −55° C. | +125° C. | +150° C. |
| 7 | 1300 | 5.66 | 2116 | 2.40 | −19.66 | 19.62 | 0.41 |
|   | 1350 | 5.75 | 2153 | 2.14 | −18.22 | 21.23 | −3.39 |
| 8 | 1300 | 5.70 | 1995 | 2.07 | 14.61 | 11.03 | −2.59 |
|   | 1350 | 5.79 | 2014 | 1.50 | −14.98 | 11.77 | −5.54 |

Figure 4A:
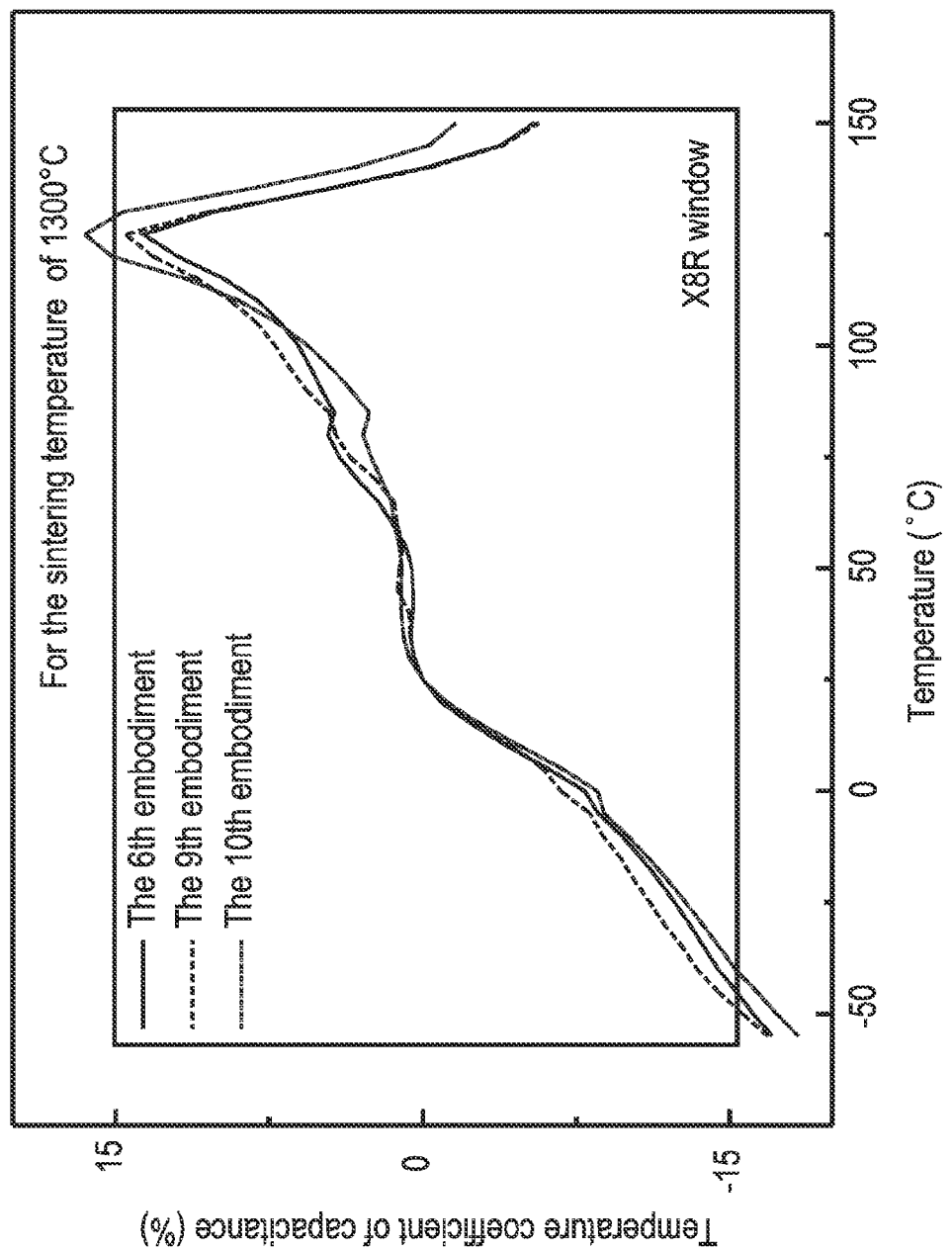
FIG. 4A is a graph illustrating the temperature coefficients of capacitance for the 6th, 9th and 10th embodiments for the sintering temperature of 1,300 degree C.
Figure 4B:
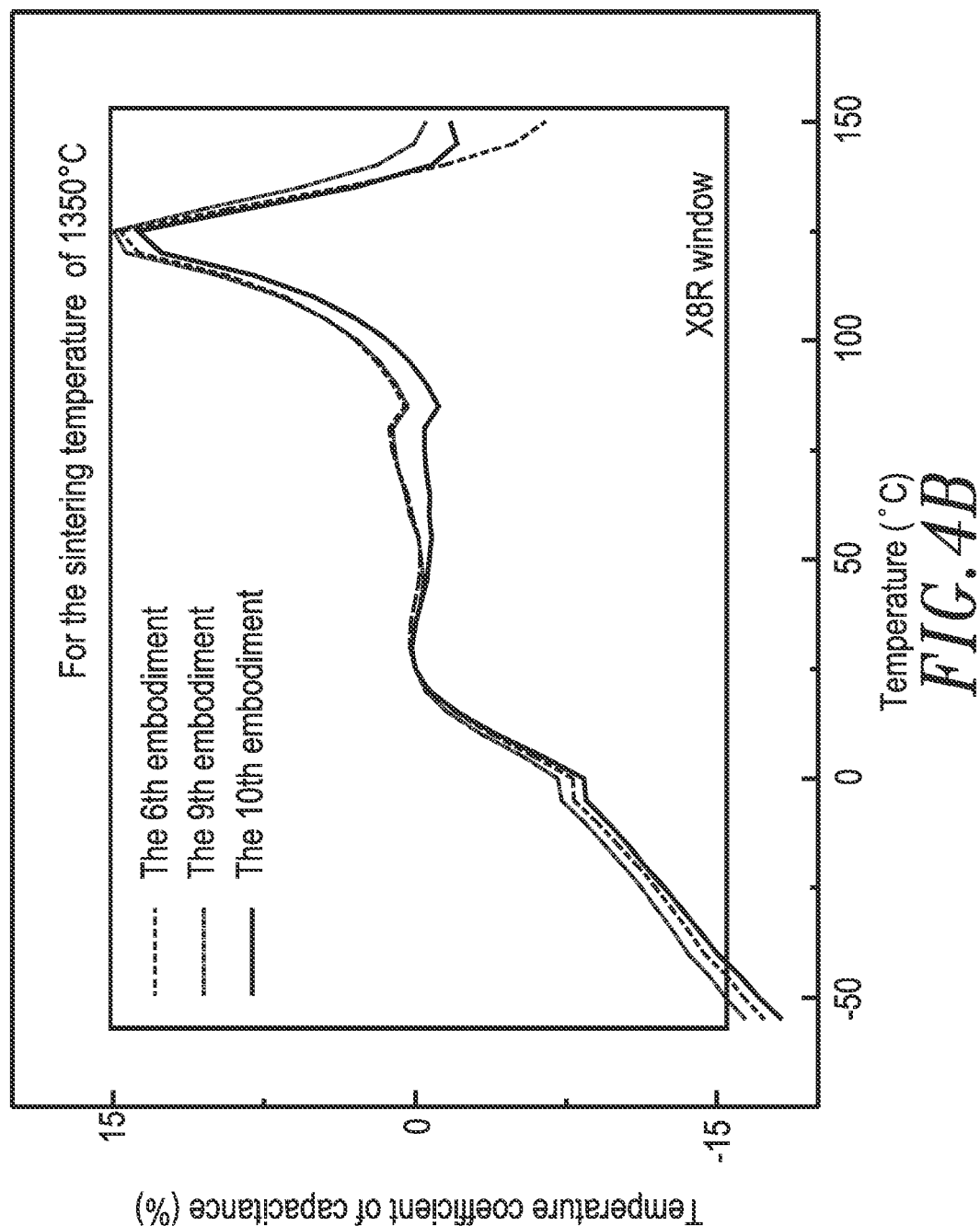
FIG. 4B is a graph illustrating the temperature coefficients of capacitance for the 6th, 9th and 10th embodiments for the sintering temperature of 1,350 degree C.
Figure 5A:
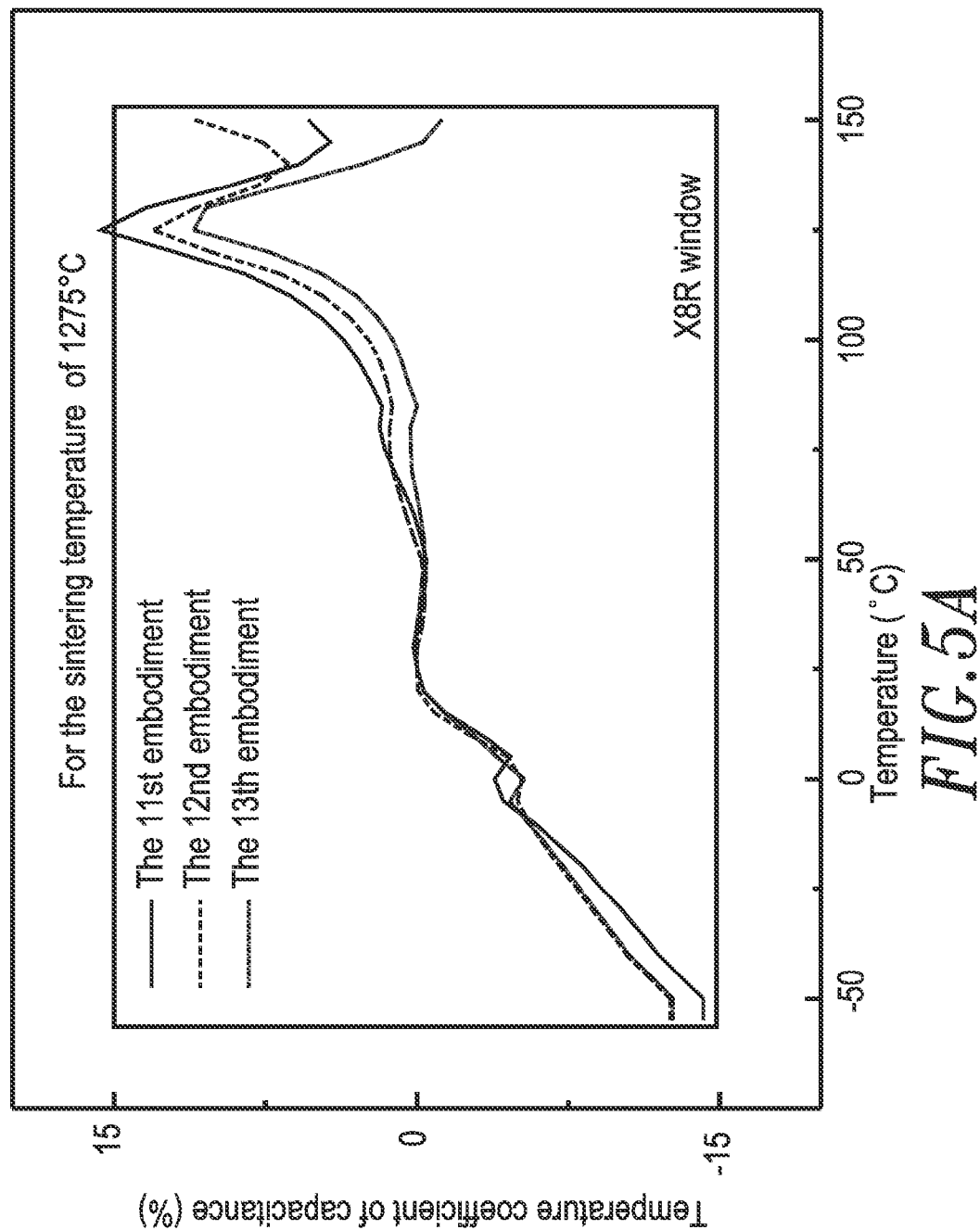
FIG. 5A is a graph illustrating the temperature coefficients of capacitance for the 11th, 12th and 13th embodiments for the sintering temperature of 1,275 degree C.
Figure 5B:
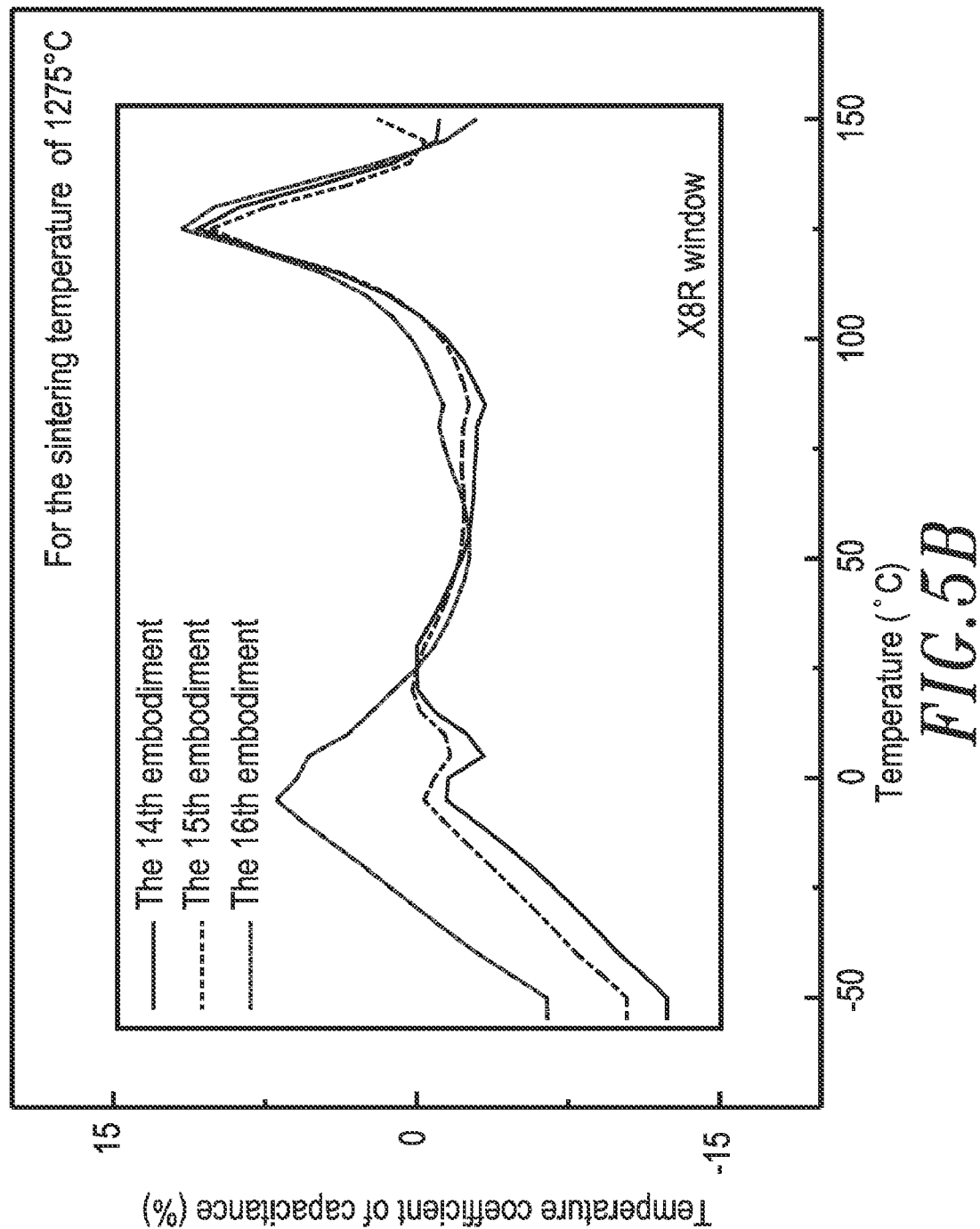
FIG. 5B is a graph illustrating the temperature coefficients of capacitance for the 14th, 15th and 16th embodiments for the sintering temperature of 1,275 degree C.
Figure 5C:
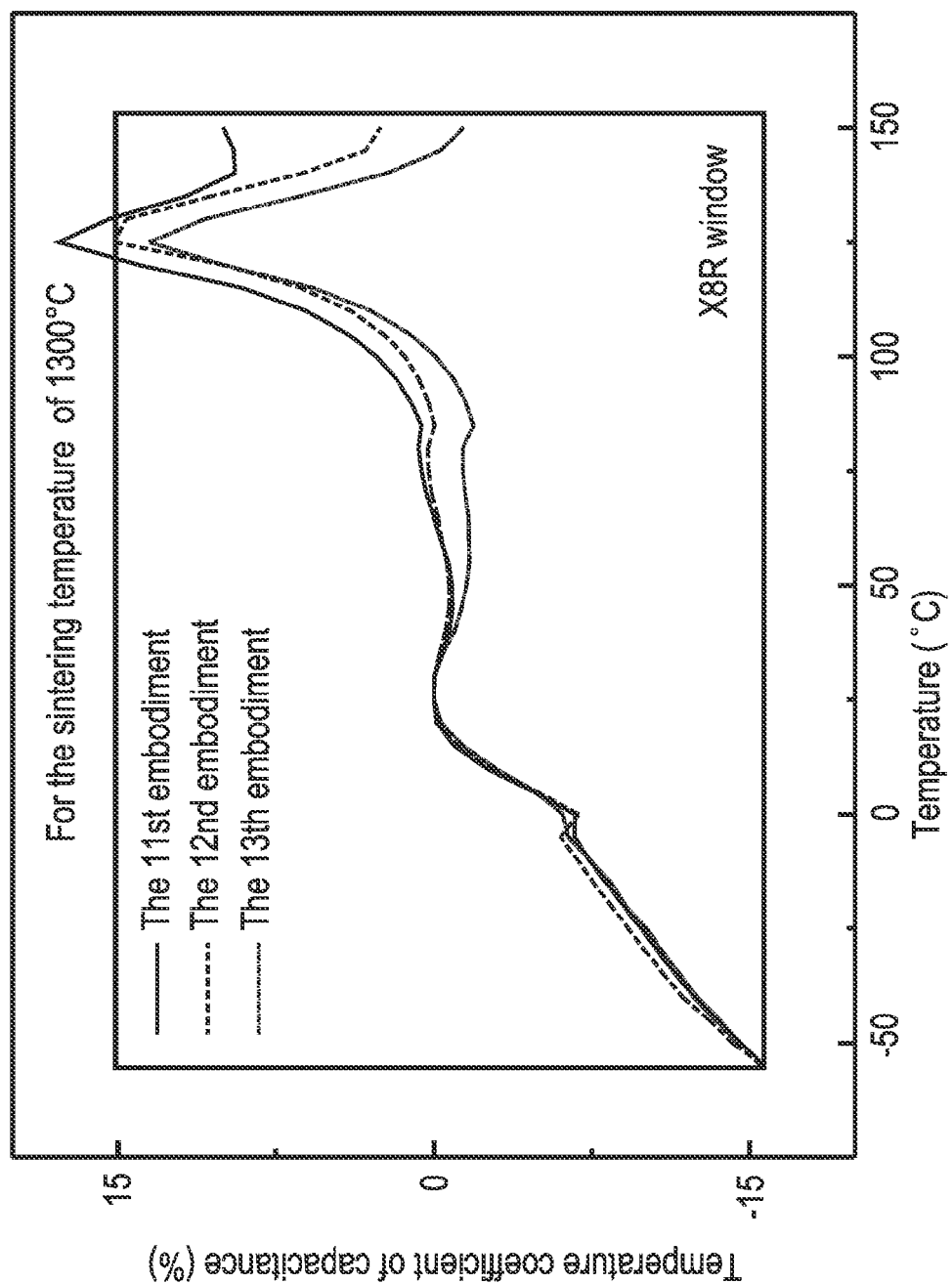
FIG. 5C is a graph illustrating the temperature coefficients of capacitance for the 11th, 12th and 13th embodiments for the sintering temperature of 1,300 degree C.
Figure 5D:
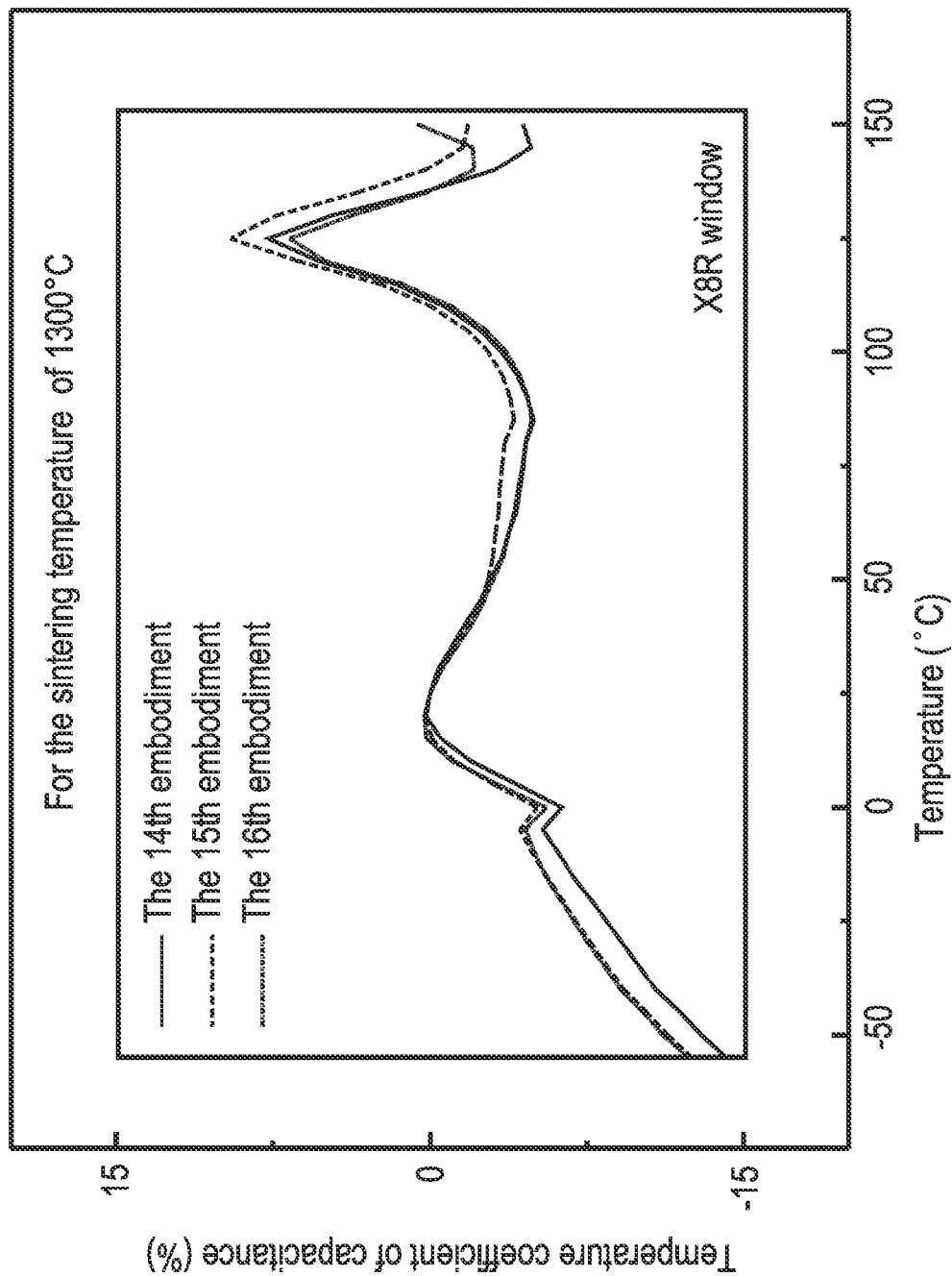
FIG. 5D is a graph illustrating the temperature coefficients of capacitance for the 14th, 15th and 16th embodiments for the sintering temperature of 1,300 degree C.

Now, please see FIGS. 4A and 4B, which show the capacitor-temperature characteristics of the compositions of the 6th, 9th and 10th embodiments for the sintering temperature of 1,300 degree C. and 1,350 degree C. From the first to 6th embodiments, we can see that the presence of $Sc_2O_3$ would make the end product less dense or less compact; therefore, the mole percentage of $BaSiO_3$ should be increased. In the 9th and 10th embodiments, the mole percentage of $BaSiO_3$ is increased. Please see Table 5.

TABLE 5 the mole percentages of the seven subcomponents in the 6th, 9th, 10th embodiments

| Embodiment | $BaTiO_3$ | $Sc_2O_3$ | $MgCO_3$ | $BaSiO_3$ | $MnCO_3$ | $La_2O_3$ | $Co_3O_4$ | NiO |
|---|---|---|---|---|---|---|---|---|
| 6 | 100 mol % | 0.5 mol % | 2.0 mol % | 2.0 mol % | 0.0 mol % | 0.0 mol % | 0.0 mol % | 0.0 mol % |
| 9 | 100 mol % | 0.5 mol % | 2.0 mol % | 1.0 mol % | 0.0 mol % | 0.0 mol % | 0.0 mol % | 0.0 mol % |
| 10 | 100 mol % | 0.5 mol % | 2.0 mol % | 3.0 mol % | 0.0 mol % | 0.0 mol % | 0.0 mol % | 0.0 mol % |

In the 10th embodiment, the end product, after undergoing sintering at the temperature of 1,350 degree C., has a more preferred density of 5.81 g/cm³, the dielectric constant of 2,071 and the dielectric loss of 1.53%. Though the presence of $BaSiO_3$ can make the end product more dense or compact, it does not have much bearing on the capacitor-temperature characteristic of the end product. In addition, excessive amount of $BaSiO_3$ can bring about the secondary phase and adversely affect the capacitor-temperature characteristic. Please see Table 6.

TABLE 6 the physical characteristics of the samples of the 9th and 10th embodiments
for the sintering temperatures of 1,300 and 1,350 degree C.

| Embodiment | Sintering temperature (° C.) | Density (g/cm³) | Dielectric constant | Df(%) | TCC(ΔC/C %) | | |
|---|---|---|---|---|---|---|---|
| | | | | | −55° C. | +125° C. | +150° C. |
| 9 | 1300 | 5.31 | 1875 | 1.92 | −18.35 | 14.50 | −5.68 |
|   | 1350 | 5.71 | 2032 | 1.52 | −16.39 | 14.95 | −0.53 |
| 10 | 1300 | 5.72 | 2070 | 2.37 | −16.87 | 16.48 | −1.63 |
|    | 1350 | 5.81 | 2071 | 1.53 | −18.20 | 13.76 | −1.72 |

Please see FIGS. 5A to 5D, which show the capacitor-temperature characteristics of the compositions of the 11th to 16th embodiments for the sintering temperature of 1,275 degree C. and 1,300 degree C. Because the X8R material has an excessively high dielectric loss, it is not suitable for practical applications. The presence of $MnCO_3$ can lower its dielectric loss and enable it suitable for practical applications.

Each of the 11th, 12th and 13th embodiments is a modification of the 7th embodiment with a different mole percentage of $MnCO_3$. Please see Table 7. As can be seen in the 11th to 13th embodiment, raising the sintering temperature can lower the dielectric loss, increase the dielectric constant and increase the density. In the 13th embodiment, when the sintering temperature is 1,300 degree C., the end product has the density of 5.81 g/cm³, the dielectric constant of 2,022 and the dielectric loss of 1.4%. Please see Table 8.

TABLE 7 the mole percentages of the seven subcomponents in the 11th to 16th embodiments

| Embodiment | $BaTiO_3$ | $Sc_2O_3$ | $MgCO_3$ | $BaSiO_3$ | $MnCO_3$ | $La_2O_3$ | $Co_3O_4$ | NiO |
|---|---|---|---|---|---|---|---|---|
| 11 | 100 mol % | 0.5 mol % | 1.0 mol % | 2.0 mol % | 0.1 mol % | 0.0 mol % | 0.0 mol % | 0.0 mol % |
| 12 | 100 mol % | 0.5 mol % | 1.0 mol % | 2.0 mol % | 0.3 mol % | 0.0 mol % | 0.0 mol % | 0.0 mol % |
| 13 | 100 mol % | 0.5 mol % | 1.0 mol % | 2.0 mol % | 0.5 mol % | 0.0 mol % | 0.0 mol % | 0.0 mol % |
| 14 | 100 mol % | 0.5 mol % | 3.0 mol % | 2.0 mol % | 0.1 mol % | 0.0 mol % | 0.0 mol % | 0.0 mol % |
| 15 | 100 mol % | 0.5 mol % | 3.0 mol % | 2.0 mol % | 0.3 mol % | 0.0 mol % | 0.0 mol % | 0.0 mol % |
| 16 | 100 mol % | 0.5 mol % | 3.0 mol % | 2.0 mol % | 0.5 mol % | 0.0 mol % | 0.0 mol % | 0.0 mol % |

Each of the 14th, 15th and 16th embodiments is a modification of the 8th embodiment with a different mole percentage of $MnCO_3$ to improve the dielectric characteristics and lower the sintering temperature so that the end product may have broader applications. Please see Table 7. As can be seen in the 14th to 16th embodiments, raising the sintering temperature can lower the dielectric loss, increase the dielectric constant and increase the density. In the 16th embodiment, when the sintering temperature is 1,300 degree C., the end product has the density of 5.94 g/cm³, the dielectric constant of 2121 and the dielectric loss of 0.98%. Please see Table 8.

TABLE 8 the physical characteristics of the samples of the 11th to 16th embodiments for the sintering temperatures of 1,275 and 1,300 degree C.

| Embodiment | Sintering temperature (° C.) | Density (g/cm³) | Dielectric constant | Df(%) | TCC(ΔC/C %) −55° C. | +125° C. | +150° C. |
|---|---|---|---|---|---|---|---|
| 11 | 1275 | 5.61 | 1947 | 1.9 | −14.2 | 15.62 | 5.39 |
|  | 1300 | 5.70 | 2009 | 1.41 | −15.71 | 17.83 | 10.01 |
| 12 | 1275 | 5.62 | 1958 | 1.7 | −12.54 | 13.02 | 10.98 |
|  | 1300 | 5.71 | 2010 | 1.52 | −15.6 | 15.19 | 2.54 |
| 13 | 1275 | 5.73 | 2024 | 1.6 | −12.67 | 11.03 | −1.22 |
|  | 1300 | 5.80 | 2022 | 1.40 | −15.7 | 13.51 | −1.40 |
| 14 | 1275 | 5.55 | 1946 | 1.6 | −12.4 | 10.81 | −1.13 |
|  | 1300 | 5.71 | 2079 | 1.41 | −14.1 | 7.72 | −4.44 |
| 15 | 1275 | 5.67 | 1852 | 1.6 | −10.4 | 10.19 | 1.946 |
|  | 1300 | 5.79 | 2089 | 1.10 | −12.51 | 9.54 | −1.82 |
| 16 | 1275 | 5.77 | 2085 | 1.6 | −6.46 | 11.62 | −2.99 |
|  | 1300 | 5.94 | 2121 | 0.98 | −12.34 | 6.71 | 0.61 |

From the above, we can see that the addition of $MnCO_3$ can increase the dielectric constant, lower the sintering temperature and lower the dielectric loss. Therefore, the addition of $MnCO_3$ can greatly improve the physical characteristics of the end product.

Figure 6A:
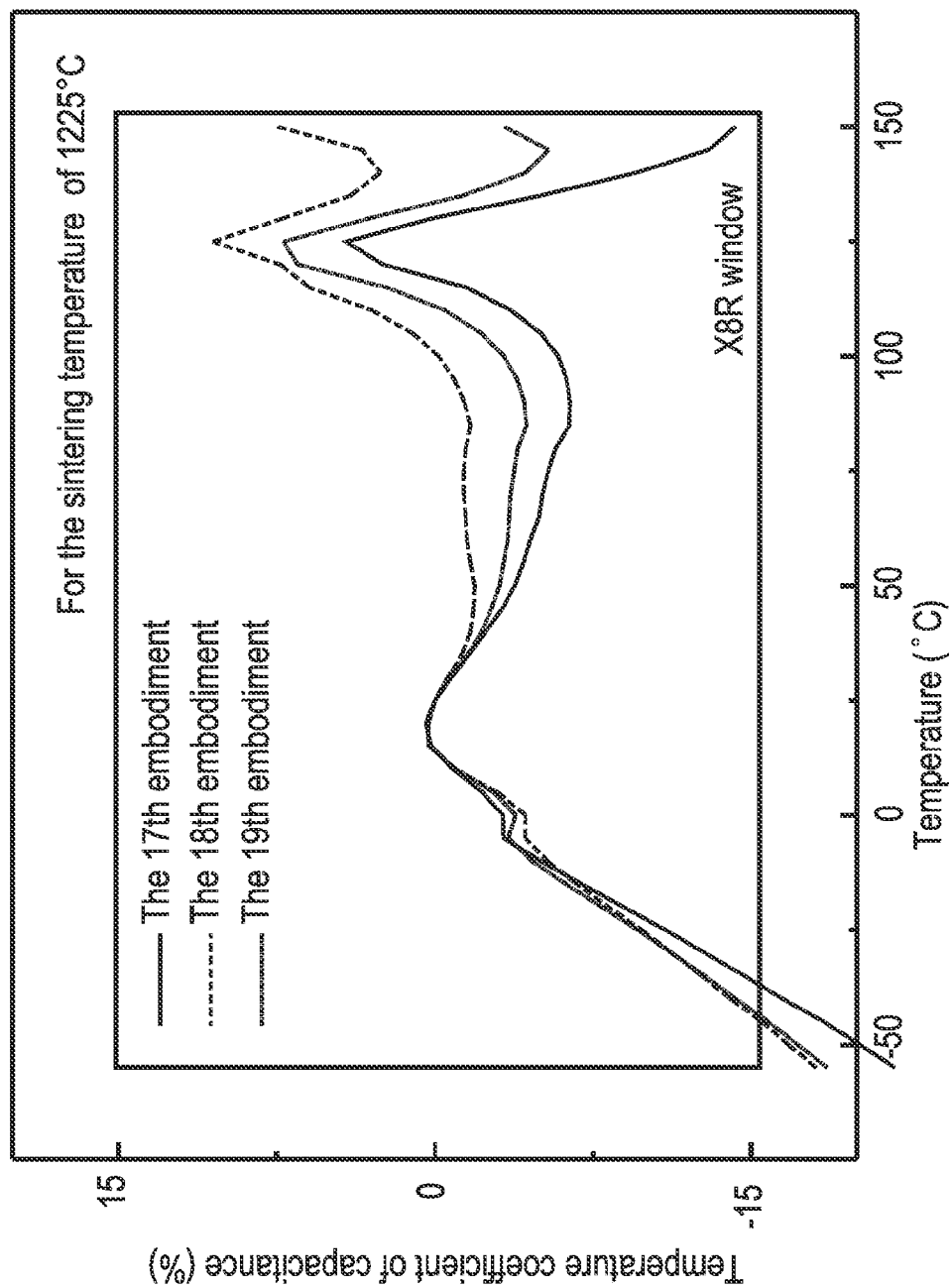
FIG. 6A is a graph illustrating the temperature coefficients of capacitance for the 17th, 18th and 19th embodiments for the sintering temperature of 1,225 degree C.
Figure 6B:
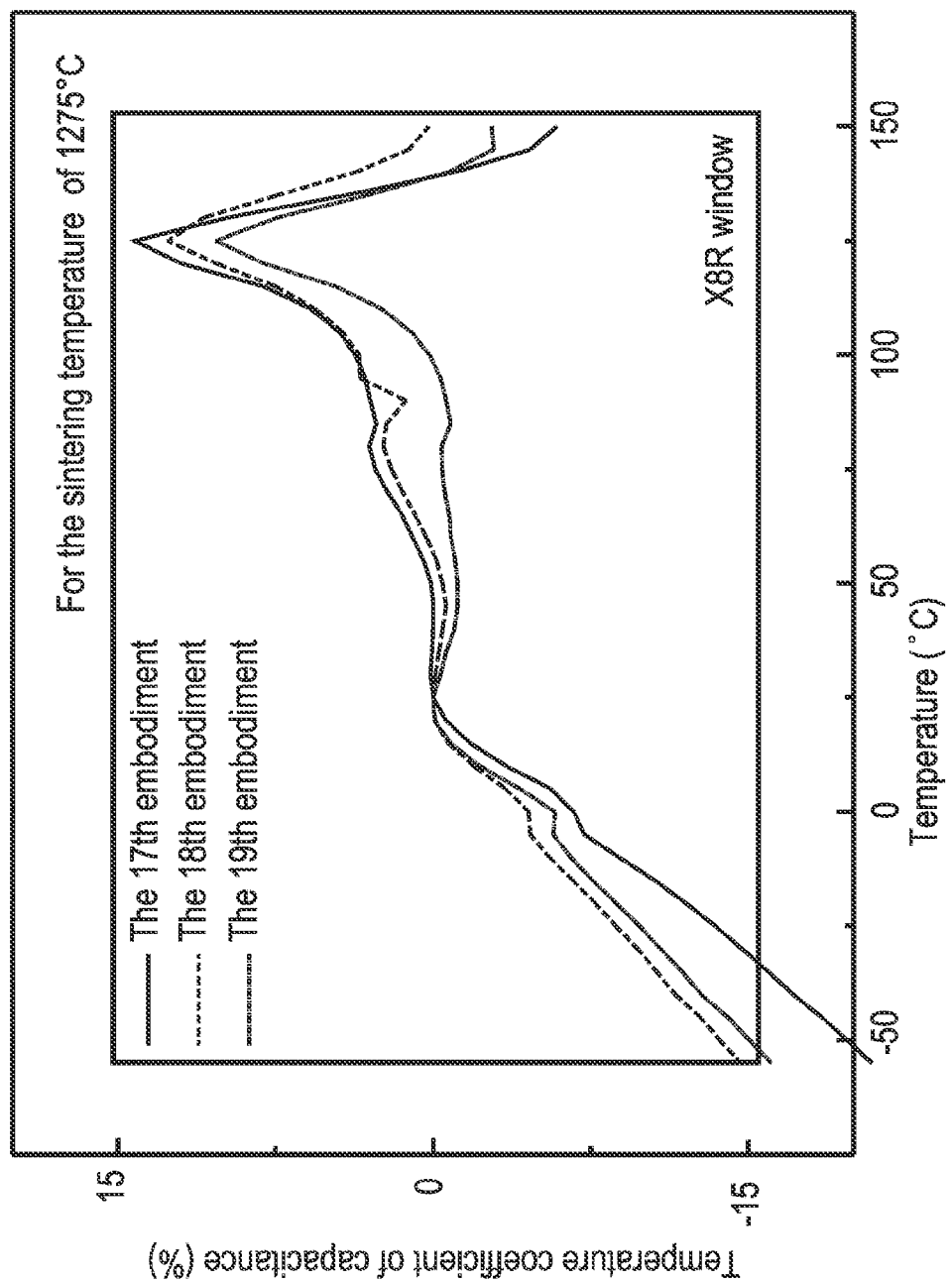
FIG. 6B is a graph illustrating the temperature coefficients of capacitance for the 17th, 18th and 19th embodiments for the sintering temperature of 1,275 degree C.
Figure 6C:
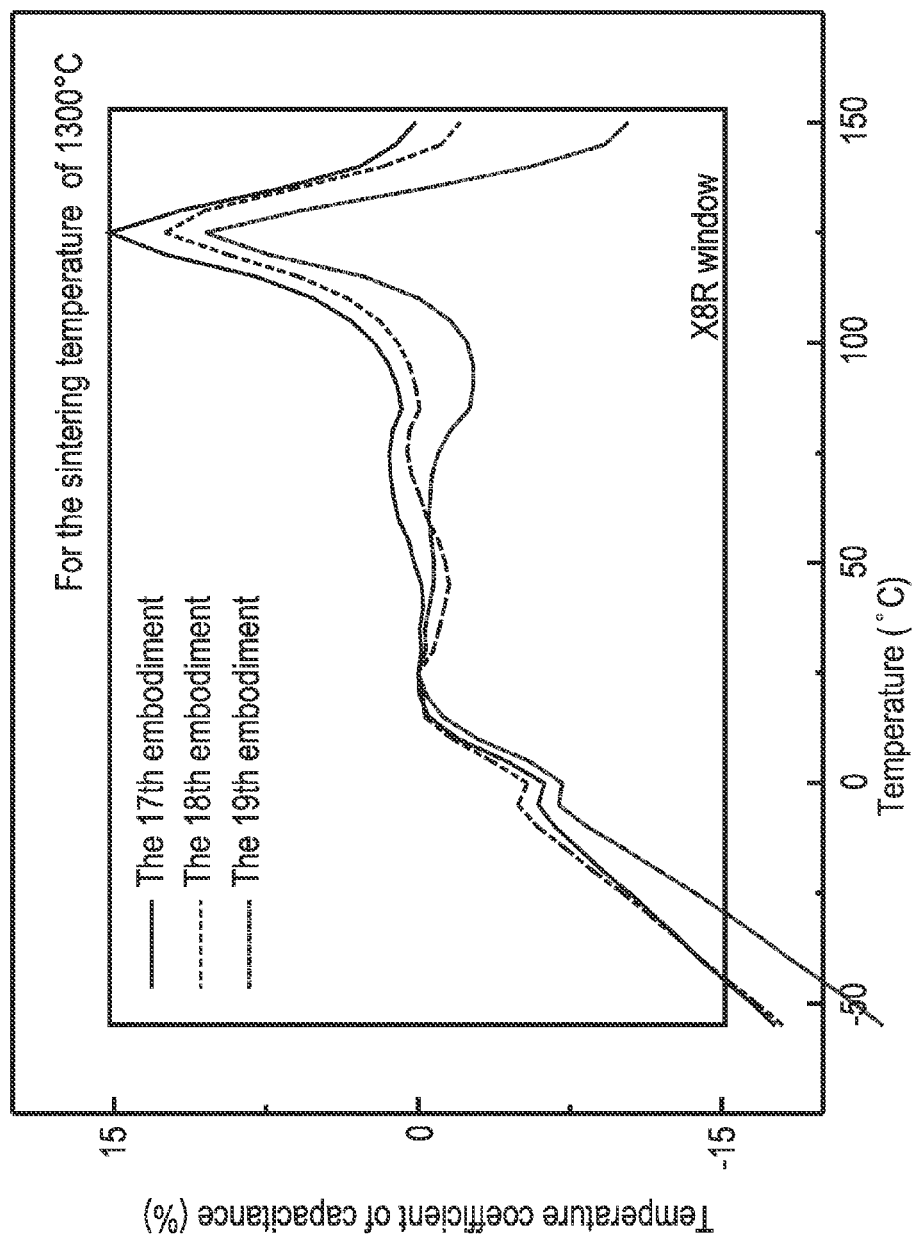
FIG. 6C is a graph illustrating the temperature coefficients of capacitance for the 17th, 18th and 19th embodiments for the sintering temperature of 1,300 degree C.

Please see FIGS. 6A to 6C, which show the capacitor-temperature characteristics of the compositions of the 17th to 19th embodiments for the sintering temperature of 1,225, 1,275 and 1,300 degree C. Because $Sc_2O_3$ is relatively expensive, we reduce its mole percentage by 50% in these three embodiments and in the mean time add $La_2O_3$, $Co_3O_4$ or NiO. Please see Table 9. The aims are to satisfy the X8R characteristic of the EIA standard and lower the cost.

TABLE 9 the mole percentages of the seven subcomponents in the 17th to 19th embodiments

| Embodiment | $BaTiO_3$ | $Sc_2O_3$ | $MgCO_3$ | $BaSiO_3$ | $MnCO_3$ | $La_2O_3$ | $Co_3O_4$ | NiO |
|---|---|---|---|---|---|---|---|---|
| 17 | 100 mol % | 0.25 mol % | 3.0 mol % | 2.0 mol % | 0.5 mol % | 0.25 mol % | 0.0 mol % | 0.0 mol % |
| 18 | 100 mol % | 0.25 mol % | 3.0 mol % | 2.0 mol % | 0.5 mol % | 0.0 mol % | 0.25 mol % | 0.0 mol % |
| 19 | 100 mol % | 0.25 mol % | 3.0 mol % | 2.0 mol % | 0.5 mol % | 0.0 mol % | 0.0 mol % | 0.25 mol % |

In the 17th embodiment, a certain amount of $La_2O_3$ is added; also, as the sintering temperature increases from 1,225 degree C. to 1,300 degree C., the dielectric constant increases. In the 17th embodiment, when the sintering temperature is 1,300 degree C., the end product has the dielectric constant of 2,169, the dielectric loss of 1.9% and the density of 5.83 g/cm$^3$.

In the 18th embodiment, a certain amount of $CO_3O_4$ is added. If the sintering temperature is 1,275 degree C., the end product has the dielectric constant of 2,618 (higher than those of 1,225 and 1,300 degree C.), the dielectric loss of 1.7% and the density of 5.84 g/cm$^3$; in addition, the end product satisfies the X8R characteristic of the EIA standard.

In the 19th embodiment, a certain amount of NiO is added. If the sintering temperature is 1,275 degree C., the end product has the dielectric constant of 2,406 (higher than those of 1,225 and 1,300 degree C.), the dielectric loss of 1.7% and the density of 5.81 g/cm$^3$. Please see Table 10.

TABLE 10 the physical characteristics of the samples of the 17th to 19th embodiments for the sintering temperatures of 1,225, 1,275 and 1,300 degree C.

| Embodiment | Sintering temperature (° C.) | Density (g/cm$^3$) | Dielectric constant | Df(%) | TCC(ΔC/C %) | | |
|---|---|---|---|---|---|---|---|
| | | | | | −55° C. | +125° C. | +150° C. |
| 17 | 1225 | 5.71 | 2169 | 1.9 | −21.77 | 4.2 | −14.25 |
| | 1275 | 5.82 | 2132 | 2.8 | −20.85 | 14.19 | −5.88 |
| | 1300 | 5.84 | 2061 | 2.8 | −22.91 | 10.51 | −10.37 |
| 18 | 1225 | 5.71 | 2058 | 1.5 | −18.05 | 10.51 | 7.46 |
| | 1275 | 5.84 | 2618 | 1.7 | −14.63 | 12.62 | 0.19 |
| | 1300 | 5.86 | 2418 | 2.2 | −17.98 | 12.47 | −2.07 |
| 19 | 1225 | 5.73 | 2164 | 1.8 | −18.56 | 7.18 | −3.27 |
| | 1275 | 5.81 | 2405 | 1.7 | −16.1 | 10.34 | −2.79 |
| | 1300 | 5.82 | 2165 | 2.0 | −17.62 | 15.21 | 0.105 |

In comparison to the prior art, the dielectric ceramic composition of the present invention has the following advantages:

1. The dielectric ceramic composition of the present invention can maintain its dielectric characteristics after undergoing sintering in a reducing atmosphere. In addition, the cost of manufacturing is lowered; therefore, the problem of the high cost of manufacturing may be solved.

2. The dielectric ceramic composition of the present invention has a stable capacitor-temperature characteristic and hence may be used in a wider temperature range (as compared to the electronic components of the prior art).

Although 19 embodiments of the present invention have been described in detail hereinabove, it should be understood that these embodiments are to be regarded in an illustrative manner rather than a restrictive manner, and all variations and modifications of the basic inventive concepts herein taught still fall within the scope of the present invention.

From the above, we can see that the dielectric ceramic composition of the present invention meets the relevant patent requirements. It is respectfully requested that the patent application be allowed.

What is claimed is:

1. A dielectric ceramic composition, comprising $BaTiO_3$, $Sc_2O_3$, $MgCO_3$, $BaSiO_3$, $MnCO_3$, and $Co_3O_4$.

2. The dielectric ceramic composition as in claim 1, wherein the mole percentage of $Sc_2O_3$ is 0.1 to 4.0 mol%.

3. The dielectric ceramic composition as in claim 1, wherein the mole percentage of $MgCO_3$ is 0.1 to 4.0 mol%.

4. The dielectric ceramic composition as in claim 1, wherein the mole percentage of $MnCO_3$ is 0.1 to 0.5 mol%.

5. The dielectric ceramic composition as in claim 1, wherein the mole percentage of $Co_3O_4$ is about 0.25 mol%.

6. The dielectric ceramic composition as in claim 1, wherein the mole percentage of $BaSiO_3$ is 0.1 to 5.0 mol%.

* * * * *